United States Patent [19]

Babiarz

[11] Patent Number: 5,274,634
[45] Date of Patent: Dec. 28, 1993

[54] PABX COMMON CHANNEL RELAY SYSTEM

[75] Inventor: Jozef Z. Babiarz, Stittsville, Canada

[73] Assignee: Mitel Corporation, Ontario, Canada

[21] Appl. No.: 950,231

[22] Filed: Sep. 24, 1992

[30] Foreign Application Priority Data

Sep. 30, 1991 [CA] Canada .............................. 2052500

[51] Int. Cl.[5] .............................................. H04L 12/56
[52] U.S. Cl. .................................... 370/60; 370/67
[58] Field of Search ............... 370/67, 60, 60.1, 94.1, 370/94.2, 110.1, 85.3

[56] References Cited

U.S. PATENT DOCUMENTS

| | | | |
|---|---|---|---|
| 4,736,409 | 4/1988 | Hasegawa et al. | 370/67 |
| 5,018,136 | 5/1991 | Gollub | 370/94.1 |
| 5,093,825 | 3/1992 | Helsmoortel et al. | 370/110.1 |
| 5,140,590 | 8/1992 | Gertsman et al. | 370/110.1 |

*Primary Examiner*—Wellington Chin
*Attorney, Agent, or Firm*—Antonelli, Terry, Stout & Kraus

[57] ABSTRACT

A high speed communication link between peripheral nodes and a single multi-link layer protocol (MLAP) controller with an integrated HDLC framer in a main control complex. Peripheral nodes contain a very simple control that forwards all the HDLC D-channel data from the peripherals to a single MLAP controller, thus making the peripheral nodes small in physical size, extremely flexible to connect to new interfaces and very portable. Accordingly it facilitates the efficient distributed deployment of the PABX. Using the described system, the PABX itself may be distributed around a building, using a backbone high speed link. Peripheral nodes may be located at various places in a building with peripherals such as line interfaces and associated digital telephones at locations as needed. They need not be centralized, adjacent the main control complex, as is now required. This facilitates the provision of a building with a flexible communication system having substantially reduced wiring requirements. The bit rate of transmission of HDLC formatted data is changed from 16 kb/s or 64 kb/s to 2.048 mb/s and visa versa. Plural modified HDLC packets are multiplexed to one physical link that is terminated by an HDLC framer inside the multi-link access protocol controller or, from one MLAP controller, many peripherals can be accessed and controlled. The functions of the present invention are transparent to the end-point HDLC framers and hence to the link layer protocol and peripheral software.

17 Claims, 6 Drawing Sheets

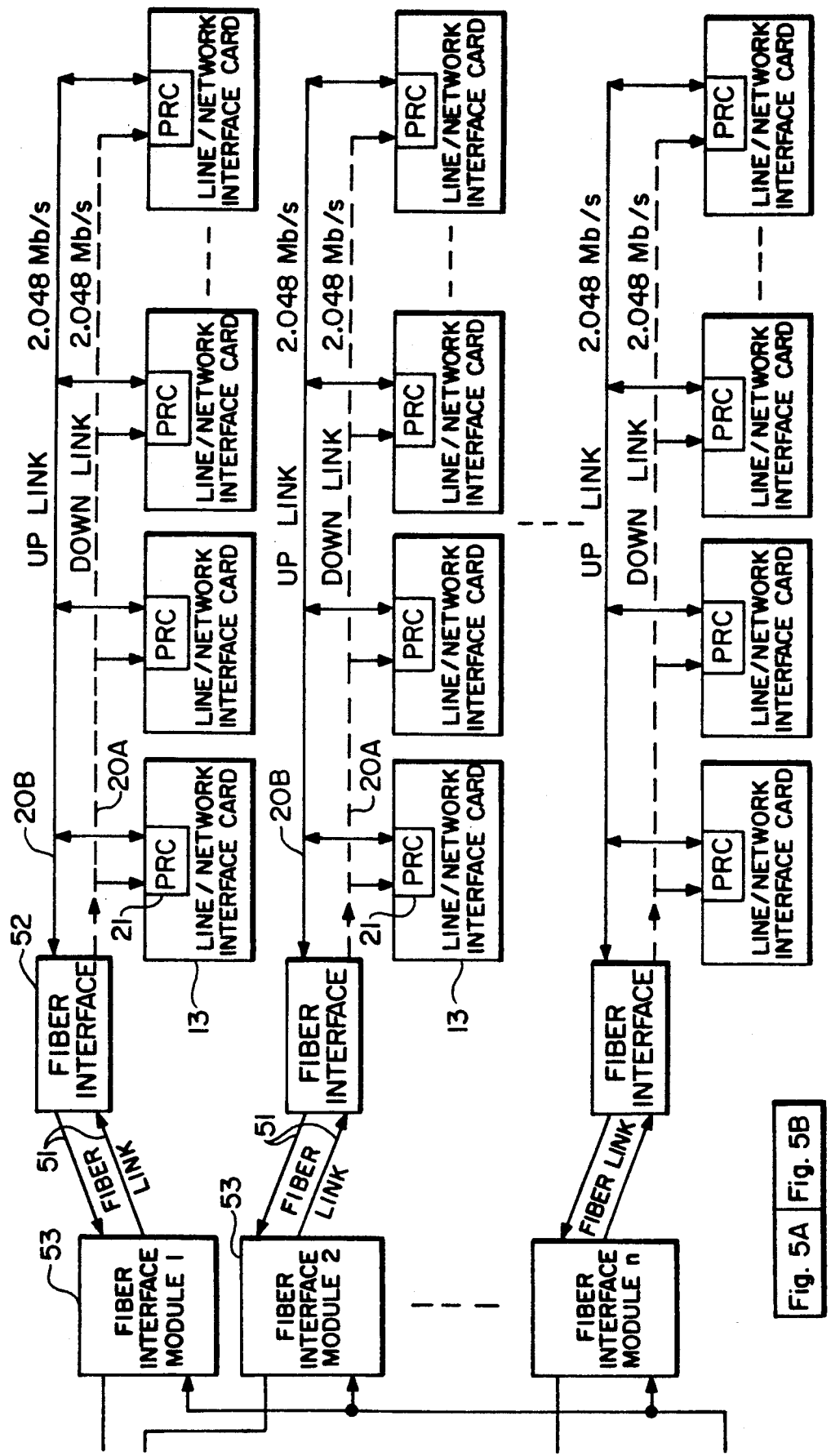

PABX COMMON CHANNEL RELAY SYSTEM

FIELD OF THE INVENTION

This invention relates to a communication system within a PABX, central office, computer, etc. for transferring data between peripherals and a main processing control, and has particular advantage for use in distributed PABX systems.

BACKGROUND TO THE INVENTION

Modern ISDN compatible PABXs typically use a main central control and peripheral interface circuits, for example the PABX type SX2000 TM sold by Mitel Corporation. Each peripheral interface circuit has a controller which controls various peripherals such as line interface circuits, network interface circuits, etc. The various peripherals communicate with the interface circuits using for example 2B+D, 23B+D or 30B+D line format protocol, the D-channel typically operating at 16 kb/s or 64 kb/s. The peripheral interfaces typically use common channel packet based signalling over the D-channel, such as LAPD (Link Access Protocol for a D-Channel), LAPB (Link Access Protocol, Balanced), MiLAP (Mitel Link Access Protocol), DPNSS (Digital Private Network Signalling System), or DASS 2 (Digital Access Signalling System No. 2). The D-channel data is transmitted using HDLC at 16 kb/s or 64 kb/s to the peripheral control.

Therefore the system requires an HDLC framer at both ends for every ISDN D-channel communication link between the peripheral control and each external interfacing peripheral. With this architecture, the peripheral controller requires significant amounts of memory and computing capability for the processing of all the different link layer protocols as well as translation before transmission to the main central control in the system's specific communication protocol.

SUMMARY OF THE INVENTION

The present invention provides a high speed communication link between the peripheral nodes and a single multi-link access protocol controller with an integrated HDLC framer in a processor of the main control complex. Each peripheral node contains a very simple control that forwards all the HDLC C-channel data packets from the peripherals to a single MLAP controller, thus making the peripheral nodes small in physical size, extremely flexible to new interfaces and very portable. Accordingly it facilitates the efficient distributed deployment of the PABX. Using the present system, the PABX itself or other premises communication system may be distributed around a building, using a backbone high speed link. Peripheral nodes may be located at various places in a building with peripherals such as line, network interfaces and associated digital telephones at locations as needed. They need not be centralized, adjacent the main control complex, as is now required. This facilitates the provision of a building with a flexible communication system having substantially reduced building wiring requirements, no need for peripheral processors, large amounts of memory at the peripheral levels, HDLC framers per every interface, bulky packaging and complex power supplies.

Further, it allows growth or modification of a single communication system by adding or replacing peripheral nodes as premises communication requirements change, which thus can be used to service the entire building, or portions of the building, without requiring extensive new wiring or modification of the wiring.

It also facilitates expansion or modification of the communication system in a modular manner and in a cost effective manner.

In accordance With the present invention, the bit rate of transmission of HDLC formatted data is changed from 16 kb/s or 64 kb/s to 2.048 mb/s and vice versa. It multiplexes plural modified HDLC packets to one physical link that is terminated by an HDLC framer inside the multi-link access protocol controller in the main control complex or, from one MLAP processor controller, many peripherals can be accessed and controlled. The functions of the present invention are transparent to the end-point HDLC framers and hence to the link layer protocol, as well as to peripheral software.

In accordance with an embodiment of the invention, a switching system is comprised of line or network interface circuits for connection to peripherals and trunks, peripheral nodes for controlling groups of line or network interface circuits, a main control and switching apparatus, apparatus for transmitting data between the peripheral nodes and the main control and switching apparatus, including a high data rate bus connected therebetween, apparatus in the peripheral nodes for receiving data from the peripherals and/or trunks and for adding in the data an identifier of a peripheral node port address of the source of the data, whereby the transmitting apparatus can transmit the data with the port address to the control and switching apparatus in order that the control and switching apparatus can recognize the source of the data and route the data accordingly.

In accordance with another embodiment, a switching system is comprised of a main control and switching apparatus, line or network interface circuits and peripheral nodes to which the peripherals are connected, apparatus for transmitting data packets between the peripheral nodes and the main control and switching apparatus, the peripheral nodes being physically located at a remote location relative to the main control and switching apparatus, and a high speed serial data bus connecting the main control and switching apparatus with the peripheral nodes, and a single MLAP controller with integrated HDLC framer in the main control and switching apparatus, and apparatus for demultiplexing, multiplexing and arbitrating the reception and transmission of data from and to the high speed data bus to and from the HDLC framer in the peripherals.

In accordance with another embodiment of the invention, a common channel relay system is comprised of a PABX having a main control complex, peripheral nodes each for connection to peripheral units (digital telephones, data terminals, trunks, etc.), a multi-link access protocol (MLAP) controller which is controlled by the main control, a packet relay controller in each peripheral node, for transmitting and receiving D-channel data to and from the peripheral units, uplink and downlink digital communication links connected between the packet relay controllers and the MLAP controller for carrying the D-channel data, and multiplexer-demultiplexer apparatus in the MLAP controller for operating the links at a bit rate which is a multiple of the bit rate of the packet relay controllers, whereby the MLAP controller is shared between plural packet relay controllers.

BRIEF INTRODUCTION TO THE DRAWINGS

A better understanding of the invention will be obtained by reference to the detailed description below, in conjunction with the following drawings, in which.

DETAILED DESCRIPTION OF THE INVENTION

Figure 1:
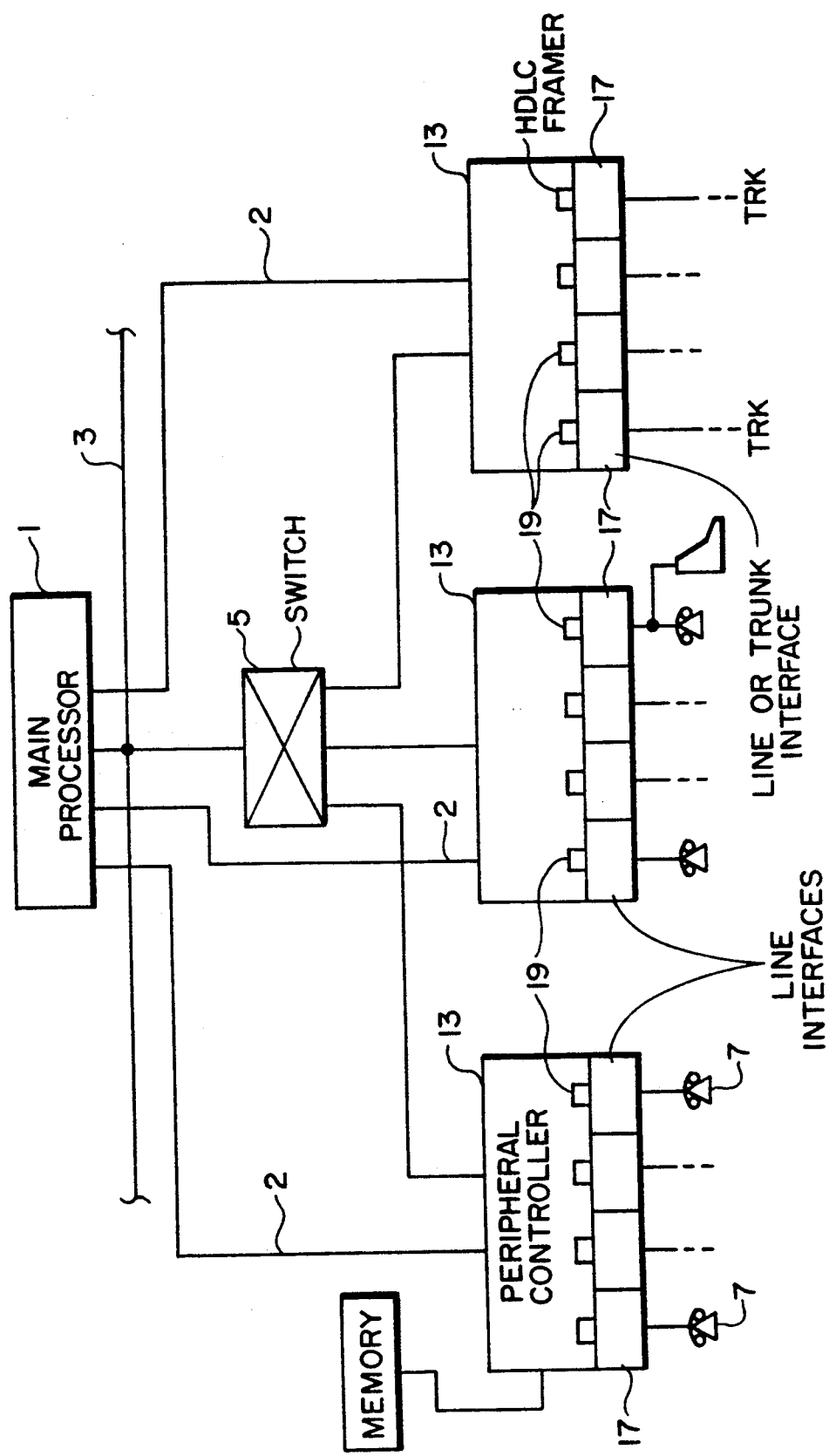
FIG. 1 is a block diagram of a prior art system.

Turning first to FIG. 1, a switching system according to the prior art is illustrated. A main processor 1 is connected to a main system bus 3 to which a switching unit 5 is connected. The elements described are generic, in that the processor 1 includes associated memory and other well known ancillary apparatus. Switching unit 5 can be a time division switch, a space division switch, a combination, or networks thereof, or some other kind of switching unit.

Peripherals such as telephone sets 7, 9, computer terminal 15 and trunks 11 are connected to line or trunk interfaces 17, and are controlled by peripheral control circuits 13. The peripheral control circuits are connected through communication links 2 to processor In some systems the peripheral control circuits may be connected directly to bus 3, depending on the form of PABX which is used.

A representative form of PABX which uses the architecture of FIG. 1 is described in U.S. Pat. No. 4,616,360 issued Oct. 7th, 1986, which is incorporated herein by reference.

Telephone sets 7 are digital telephones, for example SUPERSET 4DN ™ those which incorporate a digital network interface circuit (DNIC) sold by Mitel Corporation as type MT8972, a description of which may be found in the Mitel Semiconductor Data Book, 1991 and which is incorporated herein by reference. Telephone sets 9 and representative computer terminal 15 are well known ISDN Basic Rate station apparatus which may be used in an integrated services digital network (ISDN). Trunks 11 are representative digital public network trunks, ISDN trunks, etc. These peripherals communicate with the line or trunk interfaces 17 using the well known 2B +D, 23B +D or 30B +D line format protocol, wherein the D-channel is a data channel operating at a 16 kb/s or 64kb/s rate.

The peripheral circuits control the data received by line or trunk interfaces 17, under ultimate control of processor 1 through a dedicated communication link 2 to the peripheral controller 13. Since the D-channel can be one of numerous standardized link layer protocols (LAPD, DPNSS, DASS 2 etc.) and the link layer protocol requirement is that each connection should always be terminated by a HDLC framer, an HDLC framer 19 is provided for each ISDN C-channel or ISDN like communication link between the peripheral controller unit 13 and the external interfacing peripherals 7, 9, 15 and public network trunks. Accordingly, for example, in a communication system in which there are 1500 peripherals, there would be 1500 separate channels and 1500 HDLC framers required at the peripheral control level.

There are several problems that need to be resolved for the prior art system when engineering of the peripheral control is performed, involving processor performance, memory requirements, and number of HDLC channels required. The HDLC framers must handle both 16 kb/s and or 64 kb/s data rates. The handling of HDLC framers is a very real time intensive operation for a microprocessor, e.g. a type MC68020 processor operating at 12.5 MHz can handle approximately eight 64 kb/s channels of HDLC data and only thirty-two 16 kb/s HDLC channels under full load. However, under light call traffic the microprocessor is able to handle about ten times more. The amount of memory required to support several different protocols can be in the range of 2 Mbytes to 4 Mbytes. Also usually some additional hardware is required for microprocessor performance improvements, such as DMA channels to help move the data within the peripheral control.

It will be realized that the prior art systems engineering can be very challenging since a peripheral control that handles ISDN Primary Rate trunks will require only a few HDLC framers (one per 23B or 30B channels) but will require high processor performance because trunk utilization is very high, e.g. 36 CCS. On the other hand if the same peripheral control were used for controlling line interfaces e.g. digital telephones which require significantly lower call traffic rates of 4 CCS, the number of lines that the controller has processor performance for is significantly higher e.g. 288. to utilize the peripheral controller's full performance capability it would have to be equipped with 288 HDLC framers. However, it is not practical to handle 288 HDLC framers with one processor.

Therefore, systems engineers of prior art systems have been designing peripheral control architecture that is very hierarchical, e.g. a trunk interface card only handles trunks and has all the HDLC framer resources, the necessary memory and processor performance. As well, different line interface cards for each different type of telephone's requirements have the necessary HDLC framer resources, the necessary memory and processor performance. Each line or trunk interface card was designed to handle peak call traffic rate requirements. Statistical call traffic analysis could not be done with this architecture at the line interface level. With this architecture a processor within the peripheral control 13 was used to control and communicate between the processors that terminate the link layer protocol on the trunk interface or line interface cards. With this architecture a very processor intensive and complex peripheral control unit results, which requires large and complex packaging, large power supplies and complex interconnect backplane structures. Therefore the cost of communication systems is high and restrictive.

Figure 2:
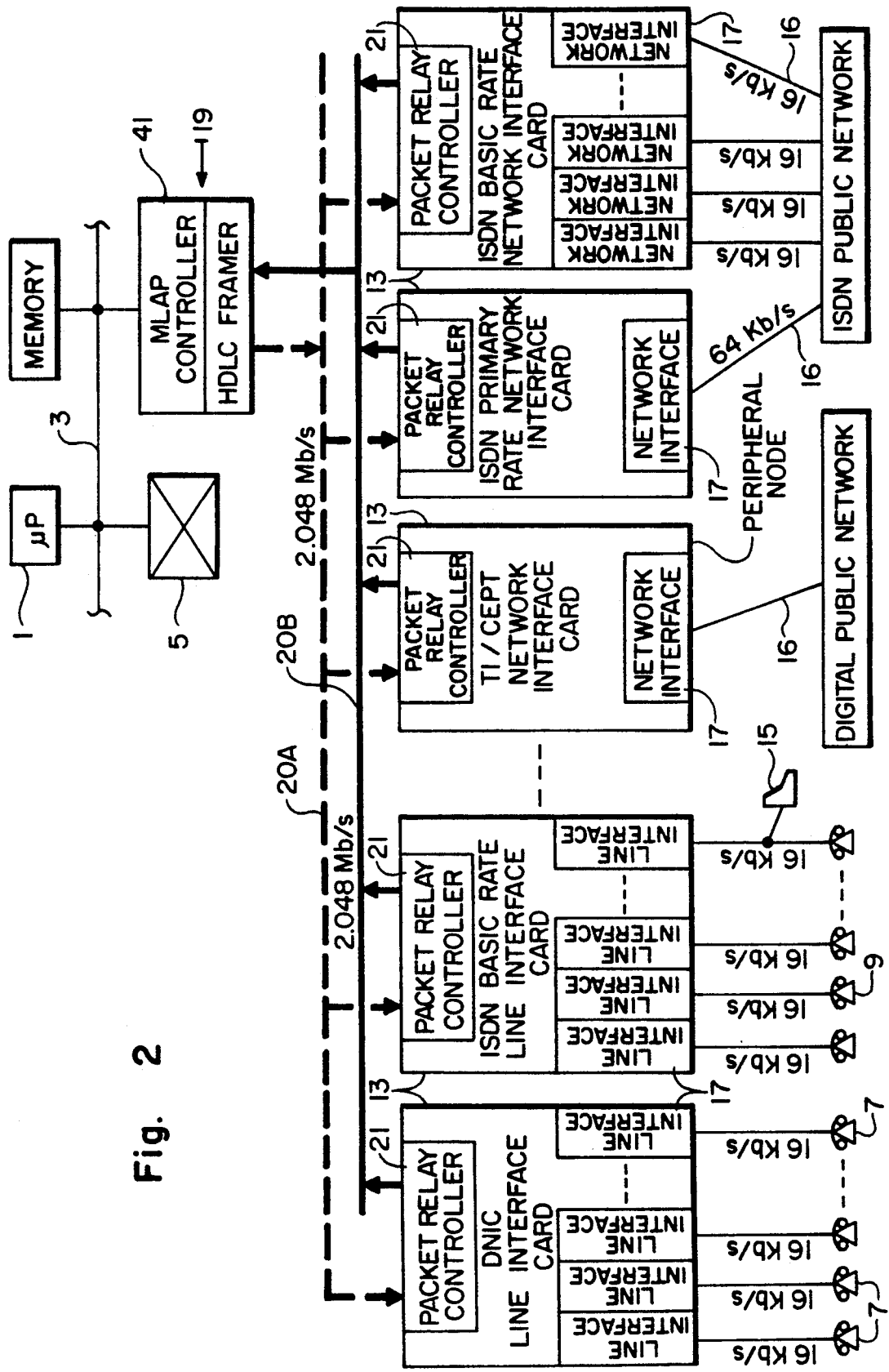
FIG. 2 is a block diagram of an embodiment of the present invention.
Figure 3:
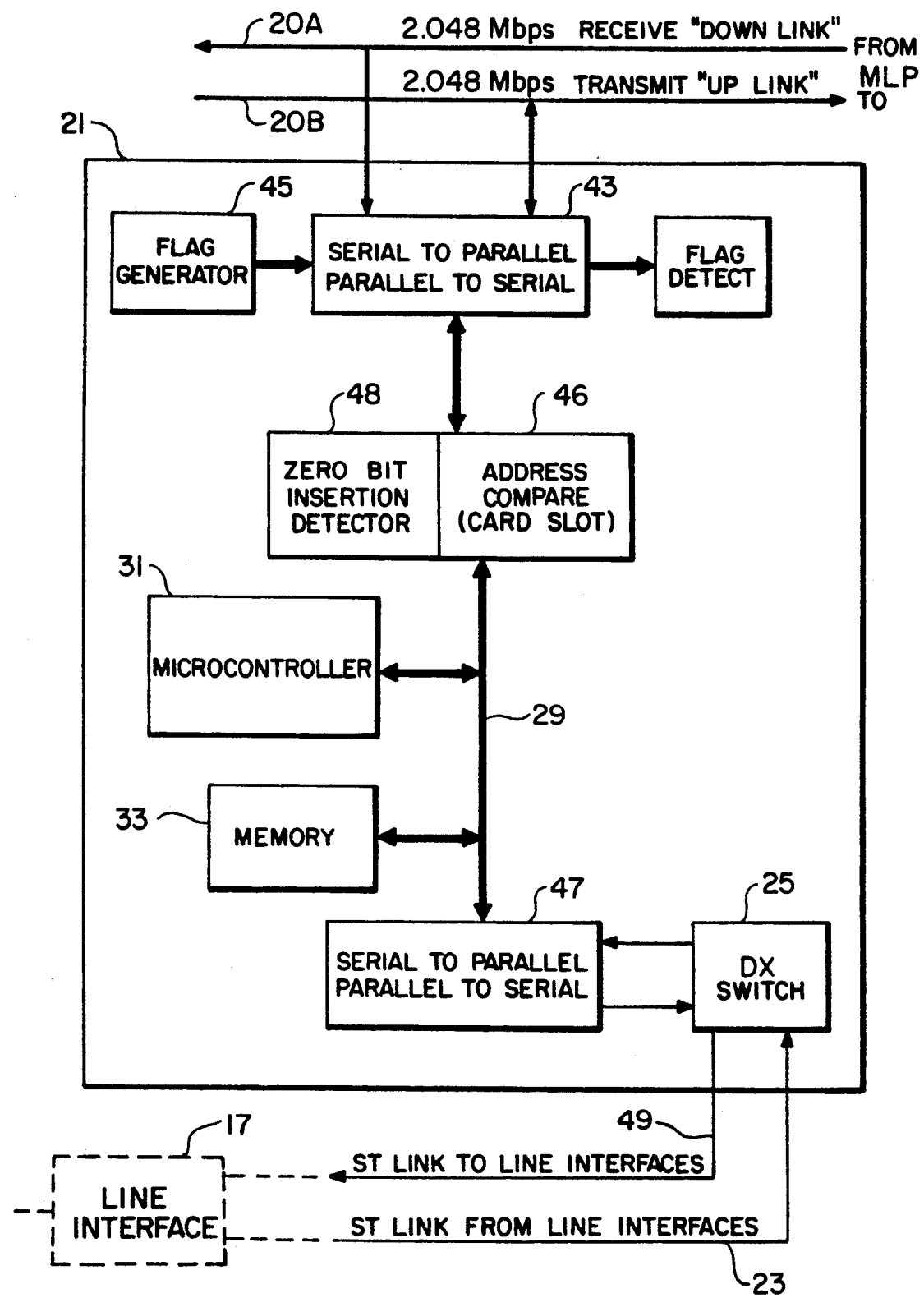
FIG. 3 is a block diagram of a packet relay controller used in the present invention.
Figure 4:
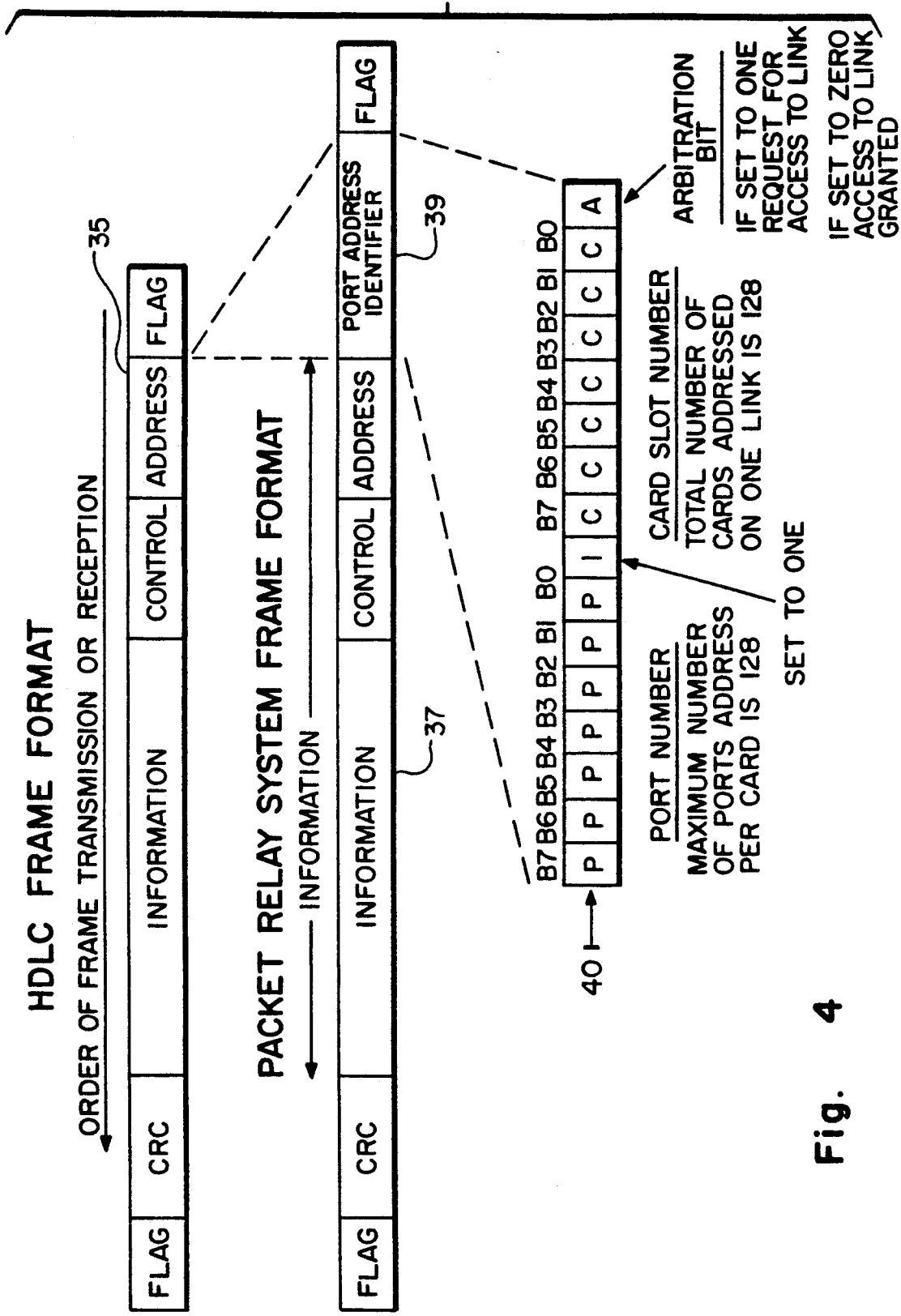
FIG. 4 is an illustration of a prior art data packet and of a data packet used in this invention, and FIGS. 5A and 5B form a block diagram of another embodiment of this invention, the pages containing those figures being assembled as shown in FIG. 5, and being referred to below together as FIG. 5.

The present invention solves this problem. A basic block diagram of the invention will be found in FIG. 2. A preferably 2.048 mb/s data link, preferably formed of optical fiber, is connected between a single MLAP controller with integrated HDLC framer 41 and the peripheral nodes 13. Each peripheral node is comprised of a packet relay controller 21 and line or network interface circuits 17. A block diagram of a packet relay controller is illustrated in FIG. 3. The form of data packets in an HDLC frame and in a modified frame as used within the present invention as carried on data link 20A, 20B is illustrated in FIG. 4.

Data is prepared by peripherals 7, 9, 15 or by a network trunk 16 in HDLC format and is transmitted to the line or network interface circuit 17 in the appropriate line code. With reference particularly to FIG. 3, for data which is to be passed on the uplink 20B to the main control, HDLC format packets are collected, which are received from the peripherals 7 in the D-channel, on line 23, (labelled ST Link From Line Interfaces). The received data is passed into a DX switch 25, preferably type MT8980 or MT8981 sold by Mitel Corporation, which are described in the aforenoted Mitel Semiconductor Data book and incorporated herein by reference. The received data is passed from the DX switch to serial to parallel converter 27, and then is applied to parallel bus 29.

Microcontroller (processor) 31, using an associated programmable read-only memory (PROM), which may be a digital signal processor, tests each HDLC packet for a flag octet ( 01111110 ). This, as may be seen in FIG. 4, forms the first octet of an HDLC frame 35.

Assuming that the processor 31 has detected a flag octet, it stores the flag and following address, control, information, CRC, and end of packet flag octets in a memory 33 via bus 29.

FIG. 4 illustrates a standard HDLC frame format 35, which consists of start flag, address, control, information, CRC, and terminating flag fields.

In the present invention, the HDLC frame format is modified to that shown in 37. Between the start flag and address, a port address identifier 39 is inserted, which identifies from or to what port the packet came from or is going to. The content of the port address identifier is shown at 40. It is formed of two octets, the first octet being a peripheral node number identifier, which can identify up to 128 peripheral nodes addressed on one link. The first bit "A" of that octet is an arbitration bit. If set to "1", it identifies a request for access to that link. If set to "0", it indicates that access to that link has been granted.

The second octet begins with a "1" followed by 7 bits identifying the maximum number of port addresses per peripheral node, in this case 128.

Returning now to FIGS. 2 and 3, as the packet continues to arrive from the peripheral nodes, the data is continuously tested by the microcontroller 31 for the terminating flag octet, so that the end of the packet can be detected. Since HDLC is a bit oriented protocol that inserts "0's" after strings of 5 "1's" in the data to prevent imitation of a flag or abort character, the stored information in the memory may not be octet aligned. It is for this reason that the microcontroller must keep track of where the packet ends.

The microcontroller 31 inserts the two byte (octet) long port address identifier between the start of packet flag and the HDLC frame address octet, as shown in FIG. 4. The two byte port address identifier is used by the call processing element in the PABX to identify where the packet came from. Since the first byte in the port address identifier contains an access arbitration bit (bit 0) and a 7 bit peripheral node address identifier (bits 1–7), it can address up to 128 peripheral nodes. The second address byte is used to address up to 128 ports on that peripheral node, with bit 0 being preserved.

The microcontroller performs 0 bit insertion on the port address identifier, since it will be received by an HDLC framer in the main control complex. In addition, microcontroller 31 recalculates the CRC for the packet that will be transmitted to the main control complex. The packet is stored in memory 33.

The microcontroller then arbitrates for access to the high speed uplink 20B that carries packets from the peripheral level to the main control complex. The arbitration for access will be described below.

Once access has been obtained, microcontroller 31 retrieves the stored packet 37 from memory 33 and forwards it including the flags at 2.048 mb/s to the main control complex.

However, prior to application to the uplink, the packet 37 is converted to serial form in parallel to serial converter 43, and flags are applied by flag generator 45, in order to complete the modified frame format 37.

The packet is received by a MLAP controller 41 which is programmed for non-protocol (non-LAPD) packet reception mode of operation. Preferably that controller is a type MC68606 controller, manufactured by Motorola, Inc.

The port address identifier has compatible bit assignment to the DLCI (data link connection identifier) field for LAPD and is used by the MLAP controller 41 to index to an external match table in an associated memory to determine whether the port address identifier has been assigned.

If the port address identifier is marked as valid, the MLAP controller 41 uses address translation tables in an associated memory to program a virtual DMA channel for transferring the packet of information from its HDLC front end framer into memory (not shown). Reference is made to the Motorola, Inc. user manual for a detailed description of the MC68606 controller function, which is incorporated herein by reference.

For HDLC packets to be transmitted from the main control complex to the peripherals, the MLAP controller 41 programs its necessary registers for transmission of the information. The port address identifier is used for the address of the packet destination, the peripheral node and the port number. MLAP controller 41 performs all the necessary functions and transmits the D-channel packet to the peripherals at 2.048 mb/s. All the packet relay controllers 21 are connected to the down link 20A. The packet relay controller 21 in the peripheral node 13 monitors the data flow on the down link 20A, looking for an HDLC flag octet.

The packet is received on the down link 20A, and is converted to parallel format in serial to parallel converter 43. The current address is detected in address compare circuit 46, and 0 bits are detected in 0 bit insertion detector 48.

Once a flag has been detected, the first address octet is tested to see if the packet is addressed to that peripheral node. If the packet was addressed to the peripheral node or to the peripherals that are connected to the line or network interface circuit, then the complete packet is copied into buffer memory 33.

The microcontroller 31 then tests the second port address identifier octet to determine to which peripheral device it is to forward the packet. The microcontroller also recalculates the new CRC for the packet, since the port address identifier octets have been removed. Now the packet is ready for transmission to the peripherals 7, 9, 15, etc. at the peripheral's receive data rate, 16 kb/s or 64 kb/s. This is performed by parallel to serial conversion in converter 47, applied to DX Chip 25 and transmission via the ST link 49 to line or network interfaces circuit 17.

Figure 5A:
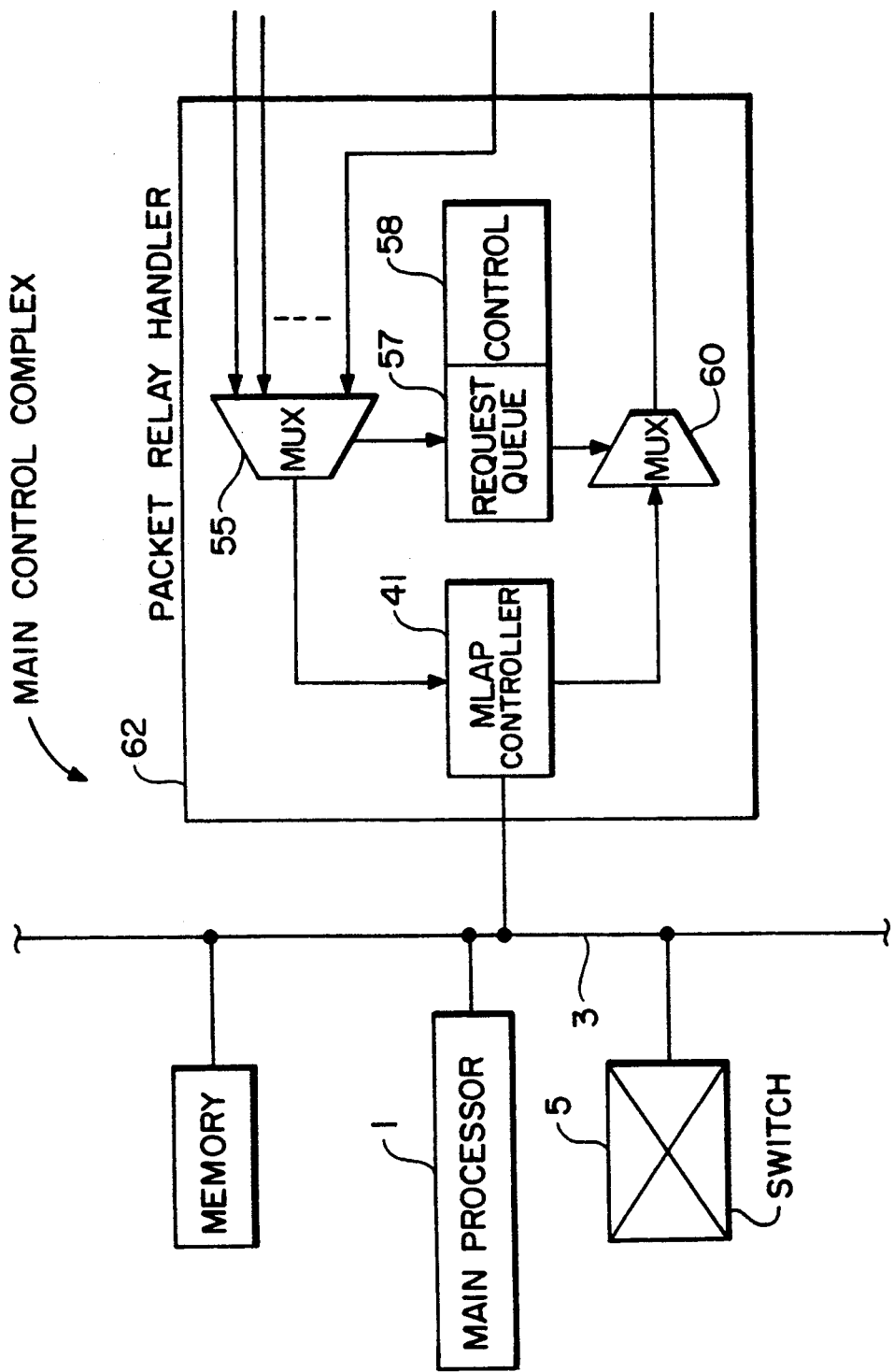

Arbitration of the data will now be described with reference to FIG. 5.

The up and down links 20A and 20B are connected to optical fiber interfaces 52 each of which is comprised of an up link and a down link. The optical fiber interfaces are interfaced at the main control complex by optical fiber interfaces 53.

The up links from the fiber interfaces 53 are connected to inputs of a multiplexer 55, the output of which is connected to MLAP controller 41 with an integrated HDLC framer.

Another output of multiplexer 55 is connected to a request queue circuit 57, which has its own control. The output of request queue 57 and of MLAP controller 41 are connected to multiplexer 60. Multiplexer 60 is connected to the down link input of fiber interfaces 53, for transmission via the fiber 51 down links to down links 20A.

The fiber links 51 form the building backbone described earlier.

In operation, the arbitration is a request, queue and grant system, and operates in the following way for obtaining access to the up link. Access to the down link is analogous. When the link is in an idle state, the packet relay controller in the peripheral node 13 arbitrates for access on the up link for transmission of packets to the MLAP controller 41 in the main control complex. Idle state is indicated by continuous high logic state ("1's) on the up link for 15 or more bit intervals. When the up link is idle, the packet relay controller can transmit a flag octet followed by a card slot number with the first bit set to "1" (high logic state), followed by a closing flag octet. These three octets define a request packet that is recognized by the multiplexer 55 and is pasted to the request queue 57.

The packet relay controller also monitors for access collisions on the link. The packet relay controller monitors the up link when it is transmitting the card slot number octet onto the link. If the transmitted information is different from the receive in the address compare circuit 46, it assumes that a transmit collision had occurred.

If a collision has been determined as having occurred, the packet relay controller stops transmitting for a period of time. The microcontroller 31 uses the peripheral node address number for a delay count before arbitrating for access to the up link again.

Upon determining that a collision has occurred, The closing flag octet is not transmitted to the multiplexer 55. The multiplexer 55 disregards any request packets that do not have a closing flag.

If there was no collision, a request packet is received by the packet relay handler 62 in a manner to be described below.

The structure involving multiplexers 55 and 60, request queue 57 and packet relay handler control 58 and MLAP controller 41 is referred to below as a packet relay handler 62. The packet relay handler uses the start flag octet for byte alignment, if required. It then tests the first bit of the card slot number. If the first bit is set to "0", indicating a normal packet, the packet is allowed to go through the multiplexer 55 to the MLAP controller 41. If, however, the first bit is set to "1", indicating a request packet, a sequencer within the packet relay handler copies that byte to the request queue memory 57, which has a first-in first-out structure.

The packet relay handler 62 does not allow requests to be sent to MLAP controller 41; instead it transmits idle bits or a normal packet to MLAP controller 41 from a different peripheral node.

A control sequence in the packet relay handler 62 buffers all the peripheral node address numbers that are requesting access to the up link for transmission of packets from the peripheral to the MLAP controller 41. The priority is in sequence as the packets are received by the packet relay handler 62. The request queue memory 57 should be of appropriate size so that the estimated peak heavy traffic circulation will not over-run. However if an over-run does occur, the main control should be notified, and the communication protocol recovers and retransmits any lost packets.

The packet relay handler control 58 monitors transmit and receive links to and from MLAP controller 41. When the packet relay controller 21 has finished transmitting its packet, indicated by the closing flag having been detected by the packet relay handler, a request for access is pending in the request queue memory. Then the packet relay handler control 58 looks for an idle state on the link coming from MLAP controller 41, as described above with regard to the packet relay controller on the peripheral node 13. When an idle state has been detected, the packet relay handler 62 sends the top peripheral node address number from the queue memory back to the packet relay controller. The peripheral node address number being sent back to the addressed peripheral node provide an indication that it had received a grant for accessing the up link, and that it can start transmitting its packet once the link is free. The packet is then transmitted by the packet relay controller 21 and has the first bit of the peripheral node address number set (logic "0") indicating to multiplexer 55 in the packet relay handler that this a normal information packet and that it should be routed to MLAP controller 41.

MLAP controller 41 interfaces to main processor 1 memory through CPU bus 3 in the main control complex in order to route the D-channel data to the main control complex.

It has been determined that under heavy traffic conditions a 1500 line PABX needs only about 2% of its available bandwidth of the communication system described herein for call control. The remaining bandwidth can be used for other data transport functions.

A person understanding this invention may now conceive of alternative structures and embodiments or variations of the above. All of those which fall within the scope of the claims appended hereto are considered to be part of the present invention.

I claim:

1. A switching system comprising:
   (a) line or network interface circuits for connection to peripherals and trunks,
   (b) peripheral nodes for controlling groups of said line or network interface circuits,
   (c) a main control and switching means,
   (d) means for transmitting data between the peripheral nodes and the main control and switching means, including a high data rate bus connected therebetween,
   (e) means in the peripheral nodes for receiving data transmitted by the peripherals and/or trunks and for adding in said data an identifier of a line or network interface circuit port address of the peripheral or trunk transmitting source of said data, whereby the transmitting means can transmit said data with said port address to the control and switching means in order that the control and switching means can recognize the source of said data and route said data accordingly.

2. A switching system as defined in claim 1, in which said data is received by said peripheral node in HDLC packet format, and adds said identifier as an additional field in each packet.

3. A switching system as defined in claim 2, including means in the main control and switching system for transmitting downlink data packets to said peripheral nodes in HDLC format modified by the addition of a field containing an identifier of a data destination port, and means in each peripheral node for decoding said additional field and in the event the port address identifies a port corresponding to a line or network interface circuit port controlled by that peripheral node, for stripping said additional field and transmitting said downlink data packets in HDLC format to the peripheral unit identified by the port address.

4. A switching system as defined in claim 3 in which said additional field is comprised of an arbitration bit, a peripheral node address number and a port number.

5. A switching system as defined in claim 3 in which data received by the peripheral node from the peripheral units and transmitted by the peripheral node to the peripheral units are in D-channels.

6. A switching system as defined in claim 3, in which the peripheral nodes are distributed around a building, and are connected to the central control and switching means via said high data rate bus.

7. A switching system as defined in claim 6, in which the high data rate bus contains an optical fiber link, ends of the optical fiber links adjacent the central control and switching means communicating therewith via multiplexer means.

8. A switching system as defined in claim 7, further including arbitrator means connected to the multiplexer means, for arbitrating the receipt and transmission of data packets between said central control and switching means and said peripheral nodes.

9. A method system as defined in claim 8, including means in the arbitrator means for comparing the card slot number address in access request packets transmitted uplink with the card slot number address transmitted downlink, and for declaring a collision if the addresses are not the same.

10. A switching system as defined in claim 9, including means in a peripheral node for ceasing uplink transmission upon the declaration of a collision.

11. A method system as defined in claim 10, including means in each peripheral node for using a peripheral node address number for a delay count in the event of detection of a collision before re-establishing arbitration for access of the peripheral node for uplink transmission again.

12. A switching system as defined in claim 9, including means for aborting transmission of a closing flag upon said declaring of a collision, whereby request packets devoid of a closing flag may be disregarded.

13. A switching system comprising a main control and switching means, line or network interface circuits and peripheral nodes to which the line or network interface circuits are connected, means for transmitting data packets between the peripheral nodes and the central control and switching means, the peripheral nodes being physically located at a remote location relative to the central control and switching means, and a high speed serial data bus connecting the main control and switching means with the peripheral nodes and a single HDLC framer in the main control and switching means, and means for demultiplexing, multiplexing and arbitrating the reception and transmission of data from and to the high speed data bus to and from the HDLC framer.

14. A switching system as defined in claim 13 including means for transmitting said high speed data along said high speed bus in HDLC format packets modified to include a data source or destination port address and means at said peripheral nodes and central control and switching means for stripping said address and retransmitting said data in proper HDLC format internally in said main control and switching means or to said peripheral circuits.

15. A common channel relay system comprising:
(a) a PABX having a main control complex,
(b) line or network interface circuits each for connection to a peripheral unit,
(c) a multi-link access protocol (MLAP) controller controlled by the main control,
(d) a packet relay controller in each peripheral node, for transmitting and receiving D-channel data to and from said peripheral units,
(e) uplink and downlink digital communication links connected between the packet relay controllers and said MLAP controller for carrying said D-channel data, and
(f) multiplexer-demultiplexer means in said MLAP controller for operating said links at a bit rate which is a multiple of the bit rate of said packet relay controllers,
whereby said MLAP controller is shared between plural packet relay controllers.

16. A relay system as defined in claim 15 in which said MLAP controller is comprised of an HDLC framer which is shared between said plural packet relay controllers.

17. A relay system as defined in claim 16 in which data transmitted in said D-channels is in HDLC packet format, and data transmitted on said communication links in said HDLC packet form modified by the addition of a field carrying a source or destination port address.

* * * * *